(12) United States Patent
Takeda (10) Patent No.: US 10,626,253 B2
(45) Date of Patent: Apr. 21, 2020

(54) TIRE RUBBER COMPOSITION

(71) Applicant: The Yokohama Rubber Co., LTD., Minato-ku, Tokyo (JP)

(72) Inventor: Shinya Takeda, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 14/888,484

(22) PCT Filed: May 1, 2014

(86) PCT No.: PCT/JP2014/062103
§ 371 (c)(1),
(2) Date: Nov. 2, 2015

(87) PCT Pub. No.: WO2014/178431
PCT Pub. Date: Nov. 6, 2014

(65) Prior Publication Data
US 2016/0075864 A1    Mar. 17, 2016

(30) Foreign Application Priority Data
May 2, 2013 (JP) ................................. 2013-096729

(51) Int. Cl.
| | |
|---|---|
| *C08L 9/06* | (2006.01) |
| *C08K 3/04* | (2006.01) |
| *B60C 1/00* | (2006.01) |
| *C08L 15/00* | (2006.01) |
| *C08L 7/00* | (2006.01) |
| *C08K 3/36* | (2006.01) |
| *C08L 9/00* | (2006.01) |
| *C08L 91/00* | (2006.01) |

(52) U.S. Cl.
CPC .............. *C08L 9/06* (2013.01); *B60C 1/0016* (2013.01); *C08K 3/04* (2013.01); *C08K 3/36* (2013.01); *C08L 7/00* (2013.01); *C08L 9/00* (2013.01); *C08L 15/00* (2013.01); *C08L 91/00* (2013.01); *Y02T 10/862* (2013.01)

(58) Field of Classification Search
CPC ..................................... C08K 3/04; C08L 9/06
See application file for complete search history.

(56) References Cited

U.S. PATENT DOCUMENTS

| | | | | |
|---|---|---|---|---|
| 4,647,614 A * | 3/1987 | Takao | ................... | B60C 1/0016 524/495 |
| 4,822,844 A * | 4/1989 | Kawakami | ............ | B60C 1/0016 524/495 |
| 5,512,626 A * | 4/1996 | Matsuo | ................. | B60C 1/0016 152/209.5 |
| 5,901,766 A * | 5/1999 | Sandstrom | ............ | B60C 1/0016 152/905 |
| 5,902,856 A * | 5/1999 | Suzuki | ..................... | C08C 19/42 525/236 |
| 5,985,978 A | 11/1999 | Kikuchi et al. | | |
| 8,127,812 B2 * | 3/2012 | Nakamura | ............ | B60C 1/0016 152/209.4 |
| 8,664,432 B2 | 3/2014 | Ozturk et al. | | |
| 2011/0086943 A1* | 4/2011 | Sato | ....................... | B60C 1/0016 523/155 |
| 2011/0319519 A1* | 12/2011 | Sone | ...................... | B60C 1/0016 523/155 |
| 2013/0059965 A1* | 3/2013 | Hirose | ................... | B60C 1/0016 524/526 |
| 2013/0210978 A1 | 8/2013 | Uekita et al. | | |
| 2013/0338255 A1 | 12/2013 | Naka et al. | | |
| 2014/0011944 A1 | 1/2014 | Kondo | | |
| 2014/0155520 A1 | 6/2014 | Takeda | | |

FOREIGN PATENT DOCUMENTS

| | | |
|---|---|---|
| EP | 2 712 890 | 4/2014 |
| JP | H10-0330542 | 12/1998 |
| JP | 2009263446 A * | 11/2009 |
| JP | 4788843 | 10/2011 |
| JP | 2012-188563 | 10/2012 |
| JP | 2013-036025 | 2/2013 |
| WO | WO 2012/165038 | 12/2012 |
| WO | WO 2013/008927 | 1/2013 |
| WO | WO 2013/161288 | 10/2013 |

OTHER PUBLICATIONS

Machine translation of JP 2012-188563 A, dated Oct. 4, 2012.*
Machine translation of JP 2009-263446 A, dated Nov. 12, 2009.*
International Search Report for International Application No. PCT/JP2014/062103 dated Aug. 5, 2014, 4 pages, Japan.
Retrieved on Jan. 3, 2019, http://www.futurechem.com.tw/tra/product_intro.php?prono=7, 4 pages, Taiwan.
Retrieved on Jan. 3, 2019, http://blog.sina.com.cn/s/blog_61bbe5e30100f1jp.html, 7 pages, China.

(Continued)

*Primary Examiner* — Vickey Nerangis (74) *Attorney, Agent, or Firm* — Thorpe North & Western (57) ABSTRACT

A tire rubber composition comprises from 30 to 60 parts by weight of a silica, from 20 to 50 parts by weight of a carbon black with a nitrogen adsorption specific surface area of from 120 to 150 m²/g, and from 50 to 80 parts by weight of an inorganic filler, which includes the silica and the carbon black, are blended per 100 parts by weight of a diene rubber that includes from 50 to 80 wt. % of a terminal-modified styrene-butadiene rubber having a vinyl unit content of 40 wt. % or more, and from 20 to 50 wt. % of butadiene rubber; an oil component in the rubber composition being from 10 to 30 parts by weight in total.

10 Claims, 1 Drawing Sheet

(56) References Cited

OTHER PUBLICATIONS

Retrieved on Jan. 3, 2019, Asahi Kasei Corporation, http://www.asahi-kasei.co.jp/amm/en/doc/technical/datasheet/tufden_ds_en.pdf, 5 pages, Japan.

Xiaopeng Li et al., The Effect of Paraffinic Oil and Aromatic Oil on the Crosslinks and Physical Properties of Butyl Rubber, Journal, Mar. 23, 2016, 2 pages, China [abstract].

* cited by examiner

TIRE RUBBER COMPOSITION

TECHNICAL FIELD

The present technology relates to a tire rubber composition whereby low rolling resistance, wet grip performance and wear resistance are improved beyond the levels of the related art.

BACKGROUND

In recent years, there has been a demand for compatibility of low rolling resistance and wet grip performance in pneumatic tires for passenger vehicles. In addition, there has been a demand for an improvement in wear resistance in order to extend tire life. In particular, rubber compositions that focus on wear resistance have been used in pneumatic tires for recreational vehicles (hereinafter, referred to as RVs) since such tires receive a large load from RVs. However, in recent years, a labeling (a display method) system has been initiated by JATMA (Japan Automobile Tyre Manufacturers Association), and both high-level compatibility of low rolling resistance and wet grip performance and improvements in the low rolling resistance and wet grip performance of pneumatic tires for RVs have been demanded.

In the related art, it is known that silica is blended with rubber compositions that constitute tread portions of pneumatic tires in order to enhance the balance between low rolling resistance and wet grip performance. However, in comparison with carbon black, the reinforcing property of silica with respect to rubber is low, there is a tendency for the wear resistance thereof to be insufficient, and it is difficult to improve low rolling resistance and wet grip performance while ensuring the high level of wear resistance that is required in RVs.

For example, Japanese Patent No. 4788843 describes that rolling resistance and grip performance are improved by a rubber composition, in which from 50 to 90 wt. % of a silica with a BET (Brunauer, Emmett and Teller) specific surface area of from 50 to 210 m²/g, from 35 to 80 parts by weight of a filler, which includes carbon black, and from 1 to 20 parts by weight of an aromatic modified terpene resin are blended with 100 parts by weight of a rubber component that is made from from 75 to 95 wt. % of natural rubber and styrene-butadiene rubber, and from 5 to 25 wt. % of a butadiene rubber that includes from 1 to 20 wt. % of syndiotactic-1,2-polybutadiene. Although, an effect of improving the rolling resistance and grip performance is found in this rubber composition, it is difficult to ensure the wear resistance that is required in pneumatic tires for RVs.

SUMMARY

The present technology provides a tire rubber composition whereby low rolling resistance, wet grip performance, and wear resistance are improved beyond the levels of the related art.

The present technology provides a tire rubber composition rubber composition comprising: from 30 to 60 parts by weight of a silica, from 20 to 50 parts by weight of a carbon black with a nitrogen adsorption specific surface area of from 120 to 150 m2/g, and from 50 to 80 parts by weight of an inorganic filler, which includes the silica and the carbon black, per 100 parts by weight of a diene rubber that includes from 50 to 80 wt. % of a terminal-modified styrene-butadiene rubber having a vinyl unit content of 40 wt. % or more, and from 20 to 50 wt. % of butadiene rubber; an oil component in the rubber composition being from 10 to 30 parts by weight of a total.

Since, in addition to from 50 to 80 parts by weight of an inorganic filler, which includes from 30 to 60 parts by weight of a silica and from 20 to 50 parts by weight of an SAF (Super Abrasion Furnace) grade carbon black, being blended with a diene rubber that includes 50 to 80 wt. % of a terminal-modified styrene-butadiene rubber having a vinyl unit content of 40 wt. % or more, and from 20 to 50 wt. % of butadiene rubber, the total oil component in the rubber composition is set to from 10 to 30 parts by weight, the tire rubber composition of the present technology can improve low rolling resistance, wet grip performance and wear resistance beyond the levels of the related art when configured as a pneumatic tire for an RV.

It is preferable that from 1 to 20 parts by weight of an aromatic modified terpene resin with a softening point of 100° C. or more is further blended into the tire rubber composition, and as a result, it is possible to configure a tire rubber composition with superior wet grip performance.

It is preferable that a substance in which the 24M4DBP (dibutyl phthalate absorption number) is from 95 to 110 ml/100 g, and the ratio ($N_2SA/IA$) of the nitrogen adsorption specific surface area ($N_2SA$) and the iodine adsorption amount (IA) is from 0.95 to 1.05, is used as the SAF grade carbon black, and as a result, it is possible to configure a tire rubber composition with superior wet grip performance and wear resistance.

At least one group selected from an amino group, a hydroxyl group, a carboxyl group, an aldehyde group, an epoxy group, an alkoxysilyl group, and a hydroxyl group-containing polyorganosiloxane structural group is preferably used as a functional group that the terminal-modified styrene-butadiene rubber includes.

A pneumatic tire that uses the tire rubber composition of the present technology can improve low rolling resistance, wet grip performance, and wear resistance beyond the levels of the related art.

DETAILED DESCRIPTION

Figure 1:
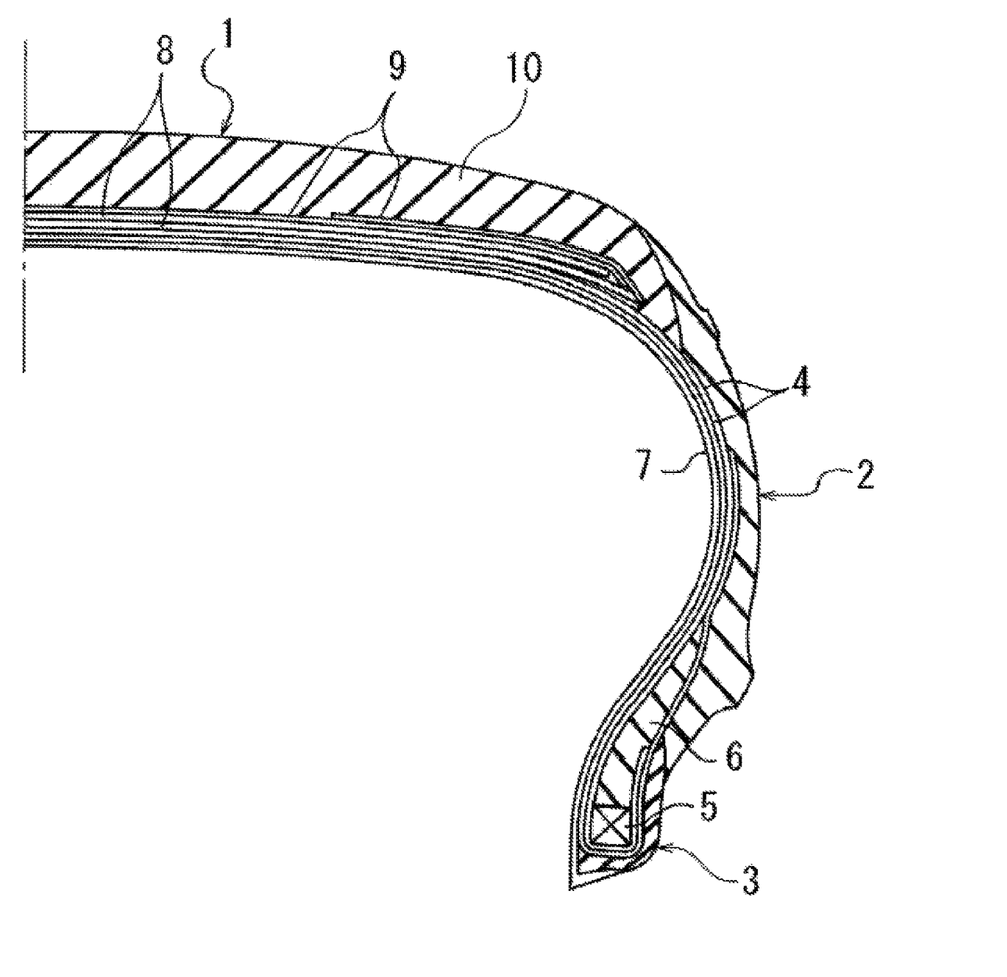
FIG. 1 is a partial cross-sectional view in a tire meridian direction that illustrates an example of an embodiment of a pneumatic tire in which a tire rubber composition of the present technology is used.

FIG. 1 is a cross-sectional view that illustrates an example of an embodiment of a pneumatic tire in which a tire rubber composition is used. The pneumatic tire is formed from a tread portion 1, a sidewall portion 2, and a bead portion 3.

In FIG. 1, two layers of a carcass layer 4, formed by arranging reinforcing cords, which extend in a tire radial direction, in a tire circumferential direction at a predetermined pitch and embedding the reinforcing cords in a rubber layer, are disposed extending between the left and right side bead portions 3. Both ends of the carcass layer 4 are made to sandwich a bead filler 6 around a bead core 5 that is embedded in the bead portions 3 and are folded back in a tire axial direction from the inside to the outside. An innerliner layer 7 is disposed inward of the carcass layer 4. Two layers of a belt layer 8, formed by arranging reinforcing cords, which extend inclined in the tire circumferential direction, in the tire axial direction at a predetermined pitch and embedding these reinforcing cords in a rubber layer, are disposed on an outer circumferential side of the carcass layer 4 of the tread portion 1. The reinforcing cords of the two layers of the belt layer 8 intersect interlaminarly so that the directions of inclination with respect to the tire circumferential direction are opposite each other. The belt cover layer 9 is disposed on an outer circumferential side of the belt layer 8. The tread portion 1 is formed from a tread rubber layer 10 on an outer circumferential side of the belt cover layer 9. The tread rubber layer 10 can be configured by the tire rubber composition of the present technology.

In the tire rubber composition of the present technology, the rubber component contains diene rubber. The diene rubber inevitably includes a terminal-modified styrene-butadiene rubber and a butadiene rubber.

In the present technology, the terminal-modified styrene-butadiene rubber is a styrene-butadiene rubber in which a single or both molecular terminals are modified with an organic compound having a functional group. The styrene-butadiene rubber may be either a solution polymerized styrene butadiene rubber or an emulsion polymerized styrene butadiene rubber. The organic compound that has a functional group preferably has reactivity with a silanol group on a surface of the silica. Examples of the functional group that reacts with the silanol group include at least one group selected from an amino group, a hydroxyl group, an alkoxysilyl group, an aldehyde group, a carboxyl group, an imino group, an epoxy group, an amide group, a thiol group, an ether group and a hydroxyl group-containing polyorganosiloxane structure. Among these groups, an amino group, a hydroxyl group, a carboxyl group, an aldehyde group, an epoxy group, an alkoxysilyl group, and a hydroxyl group-containing polyorganosiloxane structure are preferable.

In the terminal-modified styrene-butadiene rubber that is used in the rubber composition of the present technology, the vinyl unit content is 40 wt. % or more, and preferably from 40 to 80 wt. %. By setting the vinyl unit content to 40 wt. % or more, the affinity with silica is excellent, and therefore, it is possible to improve the low rolling resistance and the wet grip performance, and it is possible to improve the wear resistance. In the present specification, the vinyl unit content of the terminal-modified styrene-butadiene rubber is measured by infrared spectroscopy (the Hampton method).

In addition, the weight average molecular weight of the terminal-modified styrene-butadiene rubber is preferably 800,000 or more, and more preferably from 900,000 to 1,500,000. By setting the weight average molecular weight of the terminal-modified styrene-butadiene rubber to be 800,000 or more, it is possible to improve wear resistance. In the present specification, the weight average molecular weight of the terminal-modified styrene-butadiene rubber is measured by gel permeation chromatography (GPC) on the basis of a polystyrene standard.

The content of the terminal-modified styrene-butadiene rubber is from 50 to 80 wt. %, and preferably from 50 to 70 wt. % of 100 wt. % of the diene rubber. By configuring the content of the terminal-modified styrene-butadiene rubber to be 50 wt. % or more, it is possible to improve wet grip performance.

In the tire rubber composition of the present technology, the diene rubber inevitably includes the abovementioned terminal-modified styrene-butadiene rubber and a butadiene rubber. By incorporating a butadiene rubber, it is possible to reduce rolling resistance, and improve wear resistance. The content of the butadiene rubber is from 20 to 50 wt. %, and preferably from 20 to 45 wt. % of 100 wt. % of the diene rubber. By setting the content of the butadiene rubber to be 20 wt. % or more, it is possible to reduce rolling resistance, and improve wear resistance. In addition, by setting the content of the butadiene rubber to be 50 wt. % or less, it is possible to improve wet grip performance. The butadiene rubber that is used in the present technology is not particularly limited, and it is possible to use a butadiene rubber that is normally used in tire rubber compositions, but in particular, a butadiene rubber that includes a crystalline syndiotactic polybutadiene (UBEPOL VCR manufactured by Ube Industries, Ltd.), a butadiene rubber with a cis component, synthesized using a rare earth catalyst such as Nd, of 98% or more, or the like is suitable.

In the present technology, other than the terminal-modified styrene-butadiene rubber and the butadiene rubber, the diene rubber can contain other diene rubbers. It is suitable if the content of other diene rubbers is from 0 to 30 wt. %, and preferably from 0 to 20 wt. % of 100 wt. % of the diene rubber. Examples of the other diene-based rubbers include a natural rubber, an isoprene rubber, an unmodified solution polymerized or emulsion polymerized styrene-butadiene rubber, another terminal-modified styrene-butadiene rubber other than the abovementioned terminal-modified styrene-butadiene rubber, a butyl rubber, a halogenated butyl rubber, an ethylene-propylene-diene rubber, a nitrile rubber, a modified natural rubber, a chloroprene rubber or the like. Among these, a natural rubber, an unmodified styrene-butadiene rubber, another terminal-modified styrene-butadiene rubber, and a modified natural rubber are preferable. Additionally, the other terminal-modified styrene-butadiene rubber refers to a terminal-modified styrene-butadiene rubber in which the vinyl unit content is less than 40 wt. %.

The abovementioned diene rubber may be an oil extended product that includes oil. Additionally, 100 wt. % of diene rubber is defined as the sum of a net rubber content of the oil extended diene rubber excluding the oil (the oil extended component) and the content of the other rubbers, and each diene rubber is set within the abovementioned content range. Furthermore, in addition to the extended oil component of the diene rubber, the tire rubber composition can include a post addition oil, which is added when preparing the rubber composition. Examples of the post addition oil include an aroma oil, a process oil, a paraffin oil, a naphthenic oil, a vegetable oil, an oil in which aromatic extracts from a distillate have been treated (a TDAE), a special aromatic extract from a residual oil (SRAE) or the like.

In the tire rubber composition of the present technology, the total contained oil component is set from 10 to 30 parts by weight, and preferably from 10 to 25 wt. % per 100 parts by weight of the diene rubber. By setting the total contained oil component to 10 parts by weight or more, a deterioration in mixing processability is not caused even if an SAF grade carbon black with excellent wear resistance is used. In addition, by setting the total contained oil component to 30 parts by weight or less, it is possible to improve wear resistance. Additionally, the total contained oil component refers to the total of oil that is included in the oil extended diene rubber (the oil extended component) and the post addition oil.

In the present technology, it is preferable that an aromatic modified terpene resin be blended in a discretionary manner. By blending an aromatic modified terpene resin, it is possible to improve the balance between low rolling resistance and wet grip performance, and in particular, it is possible to improve wet grip performance. As the aromatic modified terpene resin, an aromatic modified terpene resin with a softening point of 100° C. or more is preferable, and from 100 to 130° C. is more preferable. By setting the softening point of the aromatic modified terpene resin to be 100° C. or more, it is possible to improve wet grip performance. Additionally, the softening point of the aromatic modified terpene resin is measured in accordance with JIS (Japanese Industrial Standard) K 6220-1.

Examples of the aromatic modified terpene resin that is blended in the tire rubber composition of the present technology include aromatic modified terpene resins obtained by copolymerizing a terpene such as α-pinene, β-pinene, dipentene, limonene, or camphene with an aromatic vinyl compound such as styrene, α-methylstyrene, vinyl toluene, phenol, or indene. The aromatic modified terpene resin can be a commercially available product such as YS Resin TO-125, TO-115, TO-105, or TR-105 manufactured by Yasuhara Chemical Co., Ltd.

The blending quantity of the aromatic modified terpene resin is preferably set to from 1 to 20 parts by weight, and more preferably set to from 1 to 15 parts by weight per 100 parts by weight of the diene rubber. By setting the blending quantity of the aromatic modified terpene resin to be 1 part by weight or more, it is possible to improve the balance between low rolling resistance and wet grip performance. In addition, by setting the blending quantity of the aromatic modified terpene resin to be 20 parts by weight or less, it is possible to ensure the high-level wear resistance that is required in pneumatic tires for RVs.

An inorganic filler that includes silica and an SAF grade carbon black is blended in the tire rubber composition of the present technology. By blending in silica, rolling resistance is reduced, and it is possible to increase the wet grip performance. In addition, by blending in an SAF grade carbon black, it is possible to improve wear resistance.

The blending quantity of the silica is set to from 30 to 60 parts by weight, and preferably from 30 to 50 parts by weight per 100 parts by weight of the diene rubber. By setting the blending quantity of the silica to be 30 parts by weight or more, it is possible to improve low rolling resistance and wet grip performance. In addition, by setting the blending quantity of the silica to be 60 parts by weight or less, it is possible to maintain a favorable state of wear resistance. Types of silica that can be used include wet method silica, dry method silica, surface treated silica, and the like.

The properties of the silica that is used are not particularly limited; but the nitrogen adsorption specific surface area is preferably from 100 to 230 $m^2/g$, and more preferably from 150 to 185 $m^2/g$. By setting the nitrogen adsorption specific surface area of the silica to be 100 $m^2/g$ or more, it is possible to ensure wet grip performance and wear resistance. In addition, by setting the nitrogen adsorption specific surface area of the silica to be 230 $m^2/g$ or less, it is possible to maintain a favorable state of low rolling resistance. The nitrogen adsorption specific surface area of the silica is determined in accordance with the BET method of ASTM (American Society for Testing and Materials) D 3037-81.

In the present technology, in addition to the silica, an SAF grade carbon black is blended. The SAF grade carbon black is a carbon black in which the nitrogen adsorption specific surface area is from 120 to 150 $m^2/g$. A more suitable range of the nitrogen adsorption specific surface area of the carbon black is from 135 to 150 $m^2/g$. By setting the nitrogen adsorption specific surface area of the carbon black to be 120 $m^2/g$ or more, it is possible to ensure a high level of wear resistance. In addition, by setting the nitrogen adsorption specific surface area of the carbon black to be 150 $m^2/g$ or less, it is possible to retain low rolling resistance. The nitrogen adsorption specific surface area of the carbon black is determined in accordance with JIS K6217-2.

As the SAF grade carbon black, the 24M4DBP is preferably set to from 95 to 110 ml/100 g, and more preferably set to from 100 to 110 ml/100 g. By setting the 24M4DBP of the carbon black to be 95 ml/100 g or more, it is possible to ensure a high level of wear resistance. In addition, by setting the 24M4DBP of the carbon black to be 110 ml/100 g or less, it is possible to make the dispersibility of the carbon black favorable, and therefore, it is possible to ensure a high level of wear resistance. The 24M4DBP of the carbon black is measured in accordance with JIS K6217-4.

In addition, a ratio ($N_2SA/IA$) of the nitrogen adsorption specific surface area ($N_2SA$) and the iodine adsorption amount (IA) of the abovementioned carbon black is preferably set to from 0.95 to 1.05, and more preferably set to from 1.00 to 1.05. By setting the ratio ($N^2SA/IA$) to be 0.95 or more, it is possible to retain low rolling resistance. In addition, by setting the ratio ($N_2SA/IA$) to be 1.05 or less, it is possible to make the dispersibility of the carbon black favorable, and therefore, it is possible to ensure a high level of wear resistance. The iodine adsorption amount (IA) of the carbon black is measured in accordance with JIS K6217-1.

The blending quantity of the SAF grade carbon black is set to from 20 to 50 parts by weight, and preferably from 25 to 40 parts by weight per 100 parts by weight of the diene rubber. By setting the blending quantity of the carbon black to be 20 parts by weight or more, it is possible to improve wear resistance. In addition, by setting the blending quantity of the carbon black to be 50 parts by weight or less, it is possible to improve low rolling resistance performance.

The total of the inorganic filler that includes the silica, the carbon black and the like, is preferably from 50 to 80 parts by weight, and more preferably from 50 to 70 parts by weight per 100 parts by weight of the diene rubber. By setting the total of the inorganic filler to be 50 parts by weight or more, it is possible to improve wet grip performance. In addition, by setting the total of the inorganic filler to be 80 parts by weight or less, it is possible to improve low rolling resistance performance.

Additionally, in terms of a ratio (silica/carbon black), a weight ratio of the silica and the carbon black is preferably set to from 37.5/62.5 to 75/25, more preferably set to from 40/60 to 70/30, and still more preferably set to from 50/50 to 60/40. By setting the ratio (silica/carbon black) to be 37.5/62.5 or more, it is possible to improve low rolling resistance and wet grip performance. In addition, by setting the ratio (silica/carbon black) to be 75/25 or less, it is possible to improve wear resistance.

The rubber composition of the present technology may also include other inorganic fillers other than the silica and the carbon black. Examples of other inorganic fillers include clay, talc, calcium carbonate, mica, aluminum hydroxide, and the like.

In the present technology, a silane coupling agent is preferably blended together with the silica, and as a result, the dispersibility of the silica is improved and it is possible to further increase a reinforcing property with respect to the diene rubber. The blending quantity of the silane coupling agent is preferably from 3 to 15 wt. %, and more preferably from 5 to 12 wt. %, of the blending quantity of the silica. In cases in which the blending quantity of the silane coupling agent is less than 3 wt. % of weight of the silica, the effect of improving silica dispersibility is not sufficiently obtained. In addition, if the blending quantity of the silane coupling agent exceeds 15 wt. %, the silane coupling agents undergo condensation with one another, and the desired effect is not obtained.

The silane coupling agent is not particularly limited, but is preferably a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, 3-octanoylthiopropyl triethoxysilane, and derivatives thereof, and the like. Derivatives include NXT-Z (manufactured by Momentive Performance Materials Inc.).

In addition to the above-mentioned blending agents, the tire rubber composition can contain various additives that are commonly used in tire rubber compositions such as vulcanization or crosslinking agents, vulcanization accelerators, antiaging agents, and processing aids. These additives may be kneaded with the rubber composition according to any common method and may be used in vulcanization or crosslinking. The blending quantities of these additives may be set to general blending quantities of the related art as long as the object of the present technology is not adversely affected. Such a rubber composition can be produced by mixing the above-mentioned components using a known rubber kneading machine such as a Banbury mixer, a kneader, a roll, and the like.

The tire rubber composition of the present technology can be suitably used in pneumatic tires, and in pneumatic tires for RVs in particular. In particular, the tire rubber composition can form a tire tread portion of a pneumatic tire. In a pneumatic tire that uses the rubber composition, excellent wear resistance of the high level that is required in pneumatic tires for RVs is achieved, and rolling resistance is low, fuel consumption performance is excellent, and wet grip performance is also excellent.

The present technology is further described below using examples. However, the scope of the present technology is not limited to these examples.

EXAMPLES 17 tire rubber compositions (Working Examples 1 to 8 and Comparative Examples 1 to 9) were prepared according to the formulations indicated in Tables 1 and 2 with the blending agents shown in Table 3 set as common components. With the exception of the sulfur and the vulcanization accelerators, the components were kneaded in a 1.8 L sealed mixer for 5 minutes. The mixtures were then extruded as master batches, the sulfur and the vulcanization accelerators were added, and the mixtures were then kneaded on an open roll. Additionally, in Tables 1 and 2, since the styrene-butadiene rubber (SBR 1) and the terminal-modified styrene-butadiene rubbers (modified SBR 1-3) each contain 37.5 parts by weight of an oil-extension oil, in addition to a practical blending quantity, the blending quantity rows respectively show a net blending quantity of SBR excluding the oil-extension oil in parentheses. In addition, the total oil component (the oil-extension oils that the styrene-butadiene rubber and the terminal-modified styrene-butadiene rubber contain, and the aroma oil) of the rubber composition is indicated in the "total oil component" row. Additionally, the blending agent quantities indicated in Table 3 are described as parts by weight relative to 100 parts by weight of the diene rubbers described in Tables 1 and 2 (net rubber quantities).

Vulcanized rubber samples were prepared by vulcanizing the obtained 17 tire rubber compositions in a mold with a predetermined shape for 25 minutes at 160° C. using a vulcanizing press. Subsequently, the wet performance (tan δ at 0° C.), rolling resistance (tan δ at 60° C.) and wear resistance of the samples were evaluated using the methods described below.

Wet Performance and Rolling Resistance

The tan δ of the obtained vulcanized rubber samples was measured using a viscoelastic spectrometer (manufactured by Toyo Seiki Seisaku-sho, Ltd.) under the following conditions: 10% initial strain, ±2% amplitude, 20 Hz frequency, and 0 and 60° C. temperatures. The obtained tan δ (0° C.) results are shown in the "Wet Performance" rows of Tables 1 and 2 as an index based on the value of Comparative Example 1 being set as 100. A higher wet performance index indicates a greater tan δ (0° C.), and therefore superior wet grip performance of a formed tire. In addition, the obtained tan δ (60° C.) results are shown in the "Rolling Resistance" rows of Tables 1 and 2 as an index based on the inverse of the value of Comparative Example 1 being set as 100. A higher rolling resistance index indicates a lower tan δ (60° C.), lower heat build-up, and therefore, lower rolling resistance and superior fuel consumption performance of a formed tire.

Wear Resistance

The amount of wear of the obtained vulcanized rubber samples was measured in accordance with JIS K6264, using a Lambourn abrasion test machine (manufactured by Iwamoto Seisakusho Co. Ltd.) under the following conditions: temperature=20° C., load=15 N, slip rate 50%, time=10 minutes. The obtained results are shown in the "Wear Resistance" rows of Tables 1 and 2 as an index based on the inverse of the value of Comparative Example 1 being set as 100. A higher wear resistance index indicates superior wear resistance.

TABLE 1

|  |  | Comparative Example 1 | Comparative Example 2 | Comparative Example 3 | Working Example 1 | Working Example 2 |
| --- | --- | --- | --- | --- | --- | --- |
| BR | Parts by weight | 25 | 25 | 25 | 25 | 25 |
| SBR1 | Parts by weight | 82.5(60) | 82.5(60) |  |  |  |
| Modified SBR 1 | Parts by weight |  |  | 82.5(60) | 82.5(60) | 82.5(60) |
| NR | Parts by weight | 15 | 15 | 15 | 15 | 15 |
| Silica | Parts by weight | 40 | 40 | 40 | 40 | 40 |
| Carbon black 1 | Parts by weight | 30 |  | 30 |  |  |
| Carbon black 2 | Parts by weight |  | 30 |  | 30 |  |

TABLE 1-continued

|  |  |  |  |  |  |  |
|---|---|---|---|---|---|---|
| Carbon black 3 | Parts by weight |  |  |  |  | 30 |
| Carbon black 4 | Parts by weight |  |  |  |  |  |
| Coupling agent | Parts by weight | 3.2 | 3.2 | 3.2 | 3.2 | 3.2 |
| Modified terpene resin 1 | Parts by weight |  | 2.0 | 2.0 | 2.0 | 2.0 |
| Aroma oil | Parts by weight | 2.5 | 1.0 | 1.0 | 1.0 | 1.0 |
| Total Oil Component | Parts by weight | 25.0 | 23.5 | 23.5 | 23.5 | 23.5 |
| Wet performance | Index value | 100 | 105 | 105 | 110 | 113 |
| Rolling resistance | Index value | 100 | 90 | 113 | 105 | 105 |
| Wear resistance | Index value | 100 | 105 | 100 | 110 | 115 |

|  |  | Comparative Example 4 | Comparative Example 5 | Comparative Example 6 |
|---|---|---|---|---|
| BR | Parts by weight | 25 | 25 | 25 |
| SBR1 | Parts by weight |  |  |  |
| Modified SBR 1 | Parts by weight | 82.5(60) | 82.5(60) | 82.5(60) |
| NR | Parts by weight | 15 | 15 | 15 |
| Silica | Parts by weight | 40 | 15 | 60 |
| Carbon black 1 | Parts by weight |  |  |  |
| Carbon black 2 | Parts by weight |  | 55 | 10 |
| Carbon black 3 | Parts by weight |  |  |  |
| Carbon black 4 | Parts by weight | 30 |  |  |
| Coupling agent | Parts by weight | 3.2 | 1.2 | 4.8 |
| Modified terpene resin 1 | Parts by weight | 2.0 | 2.0 | 2.0 |
| Aroma oil | Parts by weight | 1.0 | 1.0 | 1.0 |
| Total Oil Component | Parts by weight | 23.5 | 23.5 | 23.5 |
| Wet performance | Index value | 115 | 95 | 115 |
| Rolling resistance | Index value | 100 | 90 | 120 |
| Wear resistance | Index value | 105 | 130 | 85 |

TABLE 2

|  |  | Working Example 3 | Working Example 4 | Comparative Example 7 | Working Example 5 | Working Example 6 |
|---|---|---|---|---|---|---|
| BR | Parts by weight | 25 | 25 | 10 | 45 | 20 |
| Modified SBR 1 | Parts by weight |  | 82.5(60) | 103(75) | 68.8(50) | 96.3(70) |
| Modified SBR 2 | Parts by weight | 60 |  |  |  |  |
| NR | Parts by weight | 15 | 15 | 15 | 10 | 10 |
| Silica | Parts by weight | 40 | 40 | 40 | 40 | 40 |
| Carbon black 2 | Parts by weight | 30 | 30 | 30 | 30 | 30 |
| Coupling agent | Parts by weight | 3.2 | 3.2 | 3.2 | 3.2 | 3.2 |

TABLE 2-continued

|  |  | | | | |
|---|---|---|---|---|---|
| Modified terpene resin 1 | Parts by weight | 2.0 |  | 2.0 | 2.0 | 2.0 |
| Modified terpene resin 2 | Parts by weight |  | 2.0 |  |  |  |
| Aroma oil | Parts by weight | 23.5 | 1.0 | 1.0 | 4.7 | 0.0 |
| Total Oil Component | Parts by weight | 23.5 | 23.5 | 29.0 | 23.5 | 26.3 |
| Wet performance | Index value | 110 | 105 | 115 | 105 | 113 |
| Rolling resistance | Index value | 110 | 108 | 95 | 110 | 103 |
| Wear resistance | Index value | 110 | 110 | 95 | 113 | 103 |

|  |  | Comparative Example 8 | Comparative Example 9 | Working Example 7 | Working Example 8 |
|---|---|---|---|---|---|
| BR | Parts by weight | 60 | 25 | 40 | 40 |
| Modified SBR 1 | Parts by weight | 34(25) | 82.5(60) | 82.5(60) | 82.5(60) |
| Modified SBR 2 | Parts by weight |  |  |  |  |
| NR | Parts by weight | 15 | 15 | 0 | 0 |
| Silica | Parts by weight | 40 | 40 | 40 | 40 |
| Carbon black 2 | Parts by weight | 30 | 30 | 30 | 30 |
| Coupling agent | Parts by weight | 3.2 | 3.2 | 3.2 | 3.2 |
| Modified terpene resin 1 | Parts by weight | 2.0 | 2.0 | 15.0 | 20.0 |
| Modified terpene resin 2 | Parts by weight |  |  |  |  |
| Aroma oil | Parts by weight |  | 1.0 | 10.0 |  |
| Total Oil Component | Parts by weight | 10.0 | 33.5 | 22.5 | 22.5 |
| Wet performance | Index value | 80 | 110 | 113 | 115 |
| Rolling resistance | Index value | 120 | 95 | 105 | 101 |
| Wear resistance | Index value | 115 | 95 | 105 | 101 |

The types of raw materials used as indicated in Tables 1 to 3 are described below.

BR: Butadiene rubber; Nipol BR1220, manufactured by Zeon Corporation

SBR 1: Unmodified solution polymerized styrene-butadiene rubber; Nipol 1723, manufactured by Zeon Corporation; vinyl unit content: 15 wt. %; weight average molecular weight: 600,000; oil extended product containing 37.5 parts by weight of oil relative to 100 parts by weight of the rubber component Modified SBR 1: Terminal-modified styrene-butadiene rubber, styrene-butadiene rubber having a hydroxyl group at a molecular terminal; Tufden E581, manufactured by Asahi Kasei Chemicals Corporation; vinyl unit content: 43 wt. %; weight average molecular weight: 1,200,000; oil-extended product containing 37.5 parts by weight of oil relative to 100 parts by weight of the rubber component Modified SBR 2: Terminal-modified styrene-butadiene rubber, styrene-butadiene rubber having an amino group at a molecular terminal; T5560, manufactured by JSR; vinyl unit content: 61 wt. %; weight average molecular weight: 950,000; non-oil-extended product NR: Natural rubber, SIR-20

Silica: Zeosil 1165MP, manufactured by Rhodia; nitrogen adsorption specific surface area: 160 $m^2/g$.

Carbon black 1: Sho Black N234, manufactured by Cabot Japan K.K.; nitrogen adsorption specific surface area: 118 $m^2/g$; 24M4DBP: 100 ml/100 g; ratio ($N_2SA/IA$): 0.97

Carbon black 2: Sho Black N134, manufactured by Tokai Carbon Co., Ltd.; nitrogen adsorption specific surface area: 140 $m^2/g$; 24M4DBP: 107 ml/100 g; ratio ($N_2SA/IA$): 1.00

Carbon black 3: Sho Black S 118, manufactured by Cabot Japan K.K.; nitrogen adsorption specific surface area: 140 $m^2/g$; 24M4DBP: 106 ml/100 g; ratio ($N_2SA/IA$): 1.04

Carbon black 4: Seast 9M, manufactured by Tokai Carbon Co., Ltd.; nitrogen adsorption specific surface area: 155 $m^2/g$; 24M4DBP: 103 ml/100 g; ratio ($N_2SA/IA$): 0.98

Coupling agent: sulfur-containing silane coupling agent; Si69, manufactured by Evonik Degussa Modified terpene resin 1: aromatic modified terpene resin; YS Resin TO-125, manufactured by Yasuhara Chemical Co., Ltd.; softening point: 125° C.

Modified terpene resin 2: aromatic modified terpene resin; YS Resin TO-105, manufactured by Yasuhara Chemical Co., Ltd.; softening point: 105° C.

Aroma oil: Extract 4S, manufactured by Showa Shell Sekiyu K.K.

TABLE 3

| Common components of the rubber compositions | | |
| --- | --- | --- |
| Zinc oxide | 3.0 | Parts by weight |
| Stearic acid | 2.0 | Parts by weight |
| Antiaging agent | 3.0 | Parts by weight |
| Sulfur | 2.2 | Parts by weight |
| Vulcanization accelerator 1 | 2.3 | Parts by weight |
| Vulcanization accelerator 2 | 1.0 | Parts by weight |

The types of raw materials used as indicated in Table 3 are shown below.

Zinc oxide: Zinc Oxide III, manufactured by Seido Chemical Industry Co., Ltd.

Stearic acid: industrial stearic acid N, manufactured by Chiba Fatty Acid

Antiaging agent: Ozonon 6C, manufactured by Seiko Chemical Co., Ltd.

Sulfur: "Golden Flower" oil-treated sulfur powder, manufactured by Tsurumi Chemical Industry, Co., Ltd.

Vulcanization accelerator 1: Noccelar CZ-G, manufactured by Ouchi Shinko Chemical Industrial Co., Ltd.

Vulcanization accelerator 2: PERKACIT DPG, manufactured by Flexsys

As is clear from Tables 1 and 2, it was confirmed that the tire rubber compositions of Working Examples 1 to 8 maintained or improved wet grip performance (tan δ at 0° C.), low rolling resistance (tan δ at 60° C.) and wear resistance.

The rolling resistance of the rubber composition of Comparative Example 2 deteriorates as a result of the unmodified SBR 1 being blended in place of the terminal-modified styrene-butadiene rubber of Working Example 1 (modified SBR 1).

The wear resistance of the rubber composition of Comparative Example 3 is not improved since the nitrogen adsorption specific surface area of Carbon Black 1 is less than 120 m$^2$/g.

The rolling resistance of the rubber composition of Comparative Example 4 deteriorates since the nitrogen adsorption specific surface area of Carbon Black 4 exceeds 150 m$^2$/g.

The wet performance and the rolling resistance of the rubber composition of Comparative Example 5 deteriorate since the blending amount of silica is less than 30 parts by weight, and the blending amount of the carbon black exceeds 50 parts by weight.

The wear resistance of the rubber composition of Comparative Example 6 deteriorates since the blending amount of the carbon black is less than 20 parts by weight.

The rolling resistance and the wear resistance of the rubber composition of Comparative Example 7 are inferior since the content of the butadiene rubber is less than 20 wt. %.

The wet performance of the rubber composition of Comparative Example 8 deteriorates since the content of the butadiene rubber exceeds 50 wt. %, and the content of the terminal-modified styrene-butadiene rubber is less than 50 wt. %.

The rolling resistance and the wear resistance of the rubber composition of Comparative Example 9 are inferior since the total oil component in the rubber composition exceeds 30 parts by weight.

What is claimed is:

1. A tire rubber composition, comprising:
   from 30 to 50 parts by weight of a silica,
   from 25 to 40 parts by weight of a carbon black with a nitrogen adsorption specific surface area of from 135 to 150 m$^2$/g, and
   from 50 to 80 parts by weight of an inorganic filler, which includes the silica and the carbon black, per 100 parts by weight of a diene rubber that includes from 50 to 70 wt. % of a terminal-modified styrene-butadiene rubber having a vinyl unit content of 40 wt. % or more, and from 20 to 45 wt. % of butadiene rubber, the diene rubber being an oil extended product;
   a total oil component in the rubber composition being from 20 parts by weight to not more than 25 parts by weight, the total oil component in the rubber composition consisting of oil included in the diene rubber and post addition oil;
   wherein the terminal-modified styrene-butadiene rubber includes at least one group selected from a hydroxyl group, a carboxyl group, an aldehyde group, an epoxy group, and a hydroxyl group-containing polyorganosiloxane structural group.

2. The tire rubber composition according to claim 1, further comprising from 1 to 20 parts by weight of an aromatic modified terpene resin with a softening point of 100° C. or more.

3. The tire rubber composition according to claim 2, wherein the total oil component comprises aroma oil in an amount of from 1 to 4.7 parts by weight.

4. The tire rubber composition according to claim 1, wherein
   a 24M4DBP of the carbon black is from 95 to 110 ml/100 g, and
   a ratio (N$_2$SA/IA) of the nitrogen adsorption specific surface area (N$_2$SA) to an iodine adsorption amount (IA) is from 0.95 to 1.05.

5. The tire rubber composition according to claim 2, wherein
   a 24M4DBP of the carbon black is from 95 to 110 ml/100 g, and
   a ratio (N$_2$SA/IA) of the nitrogen adsorption specific surface area (N$_2$SA) to an iodine adsorption amount (IA) is from 0.95 to 1.05.

6. The tire rubber composition according to claim 1, wherein the carbon black is a Super Abrasion Furnace (SAF) carbon black.

7. The tire rubber composition according to claim 1, wherein the total oil component comprises aroma oil in an amount of from 1 to 4.7 parts by weight.

8. The tire rubber composition according to claim 1, wherein the terminal-modified styrene-butadiene rubber includes at least one group selected from the carboxyl group, the aldehyde group, and the epoxy group.

9. The tire rubber composition according to claim 1, comprising 40 parts by weight of the silica, 30 parts by weight of the carbon black with the nitrogen adsorption specific surface area of 140 m$^2$/g, and from 50 to 70 wt. % of a terminal-modified styrene-butadiene rubber, wherein the terminal-modified styrene-butadiene rubber includes a hydroxyl group at a molecular terminal.

10. A pneumatic tire comprising the tire rubber composition described in claim 1.

\* \* \* \* \*